Figure 1:
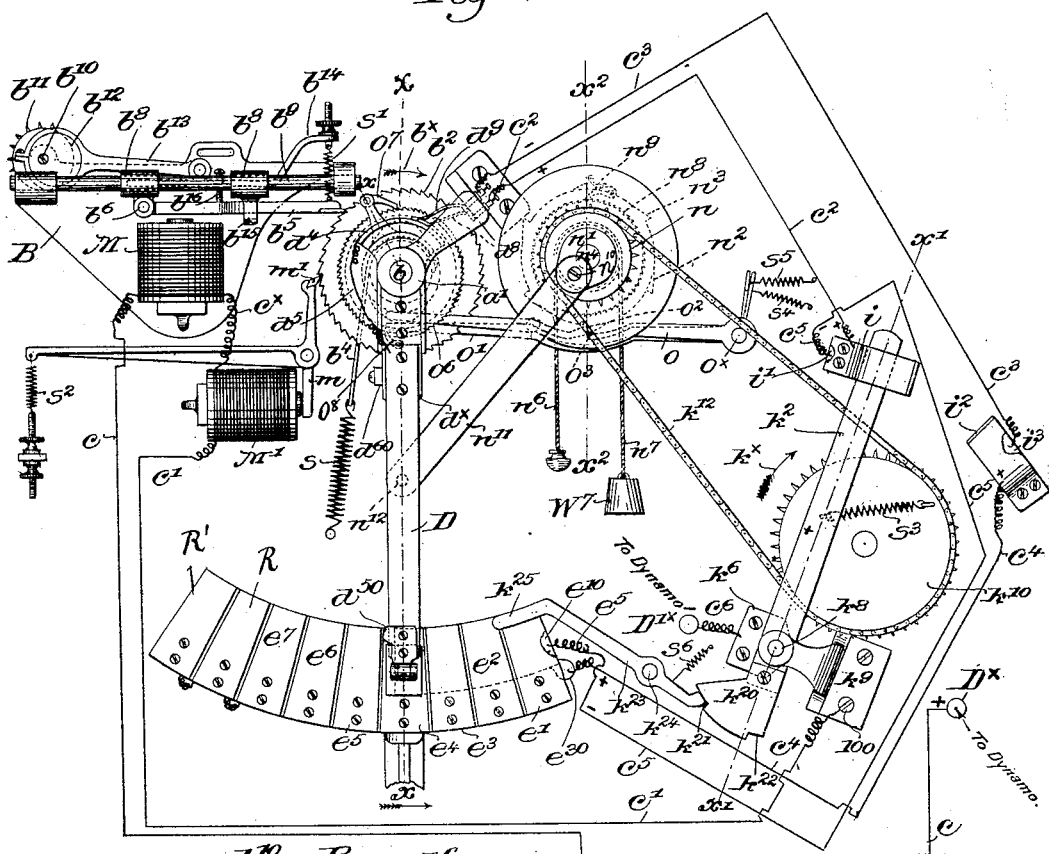

(No Model.) 3 Sheets—Sheet 1.

C. C. BRAMWELL.
METHOD OF AND APPARATUS FOR CHARGING STORAGE BATTERIES.

No. 583,323. Patented May 25, 1897.

Witnesses
A. C. Harmon
Fred S. Greenleaf

Inventor
Clarence C. Bramwell
by Crosby Gregory attys.

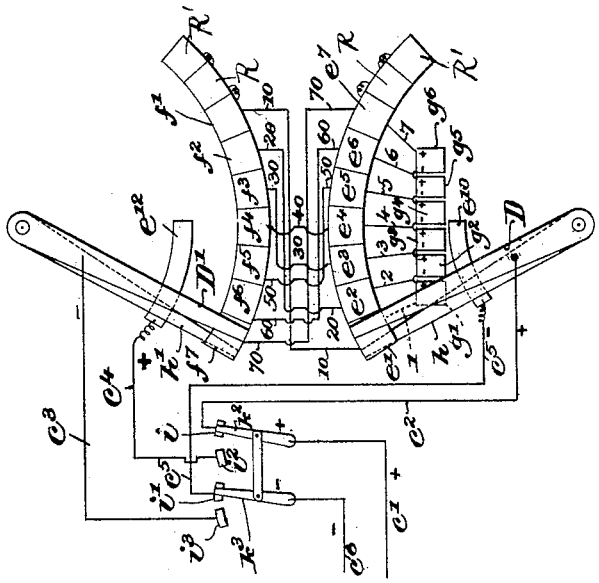
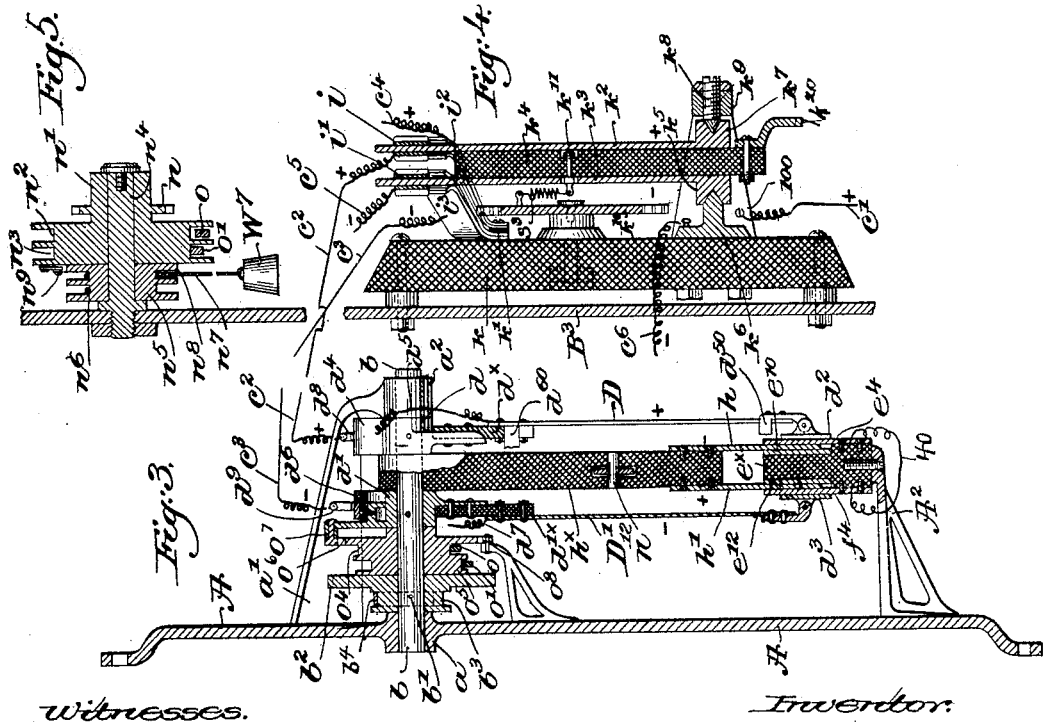

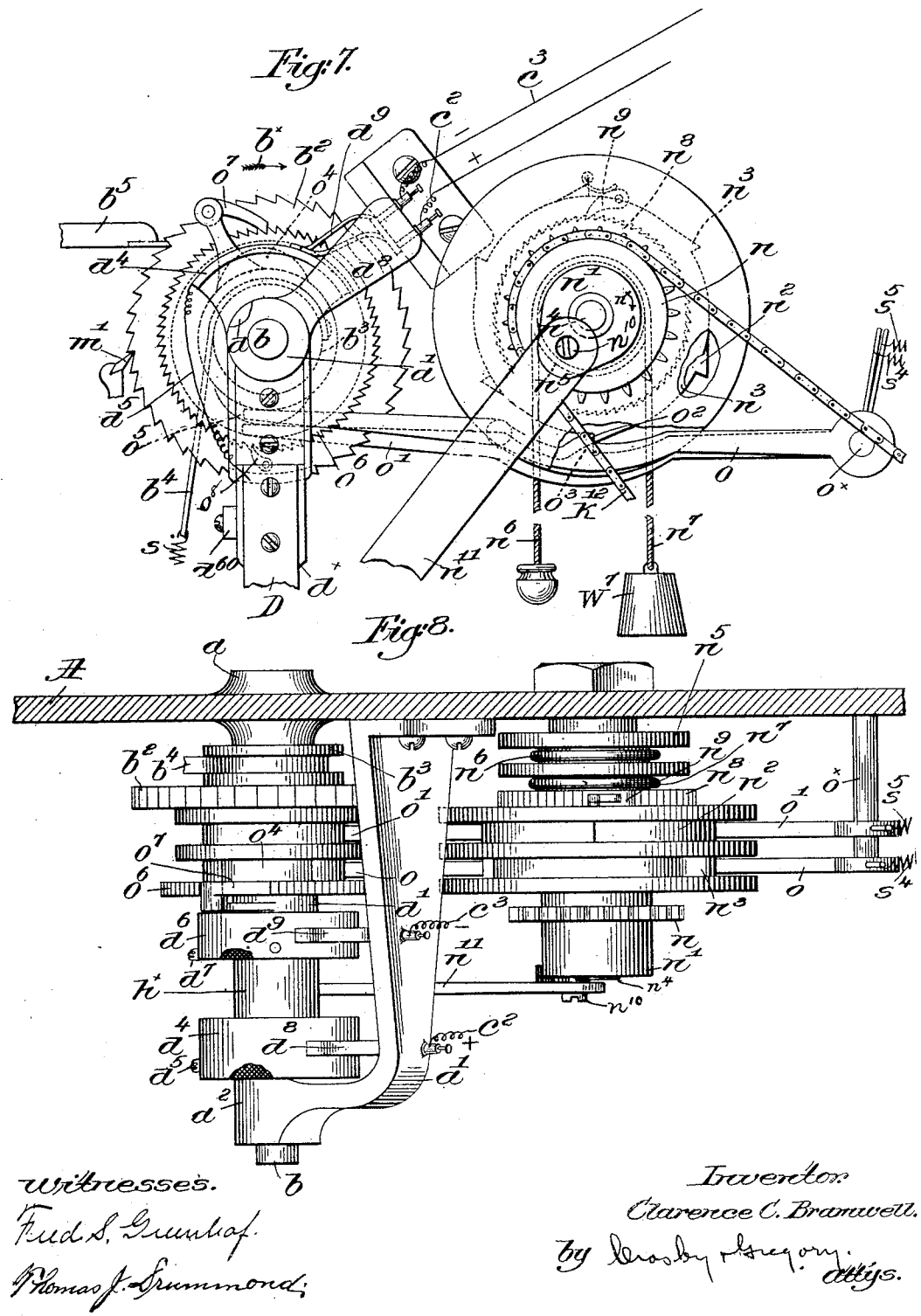

UNITED STATES PATENT OFFICE.

CLARENCE C. BRAMWELL, OF HYDE PARK, MASSACHUSETTS.

METHOD OF AND APPARATUS FOR CHARGING STORAGE BATTERIES.

SPECIFICATION forming part of Letters Patent No. 583,323, dated May 25, 1897.

Application filed August 22, 1895. Serial No. 560,168. (No model.)

*To all whom it may concern:*

Be it known that I, CLARENCE C. BRAMWELL, of Hyde Park, county of Norfolk, State of Massachusetts, have invented an Improvement in Methods of and Apparatus for Charging Storage Batteries, of which the following description, in connection with the accompanying drawings, is a specification, like letters and figures on the drawings representing like parts.

It is now usual to charge storage batteries by transmitting the electric current to a series of cells simultaneously, thus requiring the current to be of sufficient strength to charge the whole number of cells before any less number are charged. This requires the employment of a dynamo of the requisite power to furnish such a current, and until the strength of the current rises to the proper point the work of the dynamo is not utilized. When the requisite strength of current for charging the whole series of cells has been attained, it must be maintained at such point or very near it, any surplus current being wasted in the dynamo or elsewhere and decrease in the current resulting in absolute waste, so far as charging the battery is concerned. For this reason it has heretofore been impossible economically to utilize a varying source of power for driving a dynamo to charge a storage battery or to make use of a dynamo which could not deliver a current sufficient to charge all the cells of a battery simultaneously without changing the connections of the cells before and after charging.

It has long been desired to utilize the power generated by wind-wheels for driving dynamos for the purpose of charging storage batteries, but as the power varies between such wide limits and averaging for the greater part of the time a speed in the neighborhood of eleven miles per hour and at other times a gale and with many stops and starts and sudden changes of various degrees it has not been possible with economy to thus drive a dynamo. The power of the wind-wheel is thus so variable and intermittent that the storage battery must be of sufficient size to store up enough energy to enable the plant to be used when the windmill is not providing sufficient power, and on account of the greater size of the battery the size of the mill and dynamo must be increased, adding greatly to the cost of a plant of comparatively small capacity.

As is well known, a wind-wheel is constantly starting and stopping, and the dynamo will be driven accordingly, so that it is necessary to have a dynamo that quickly excites itself and gives a useful current, and a dynamo depending on a shunt-winding to excite itself has been heretofore used for this purpose. Such type of dynamo, however, must attain a high speed before it can excite itself at all; but I use a series-wound dynamo which is normally short-circuited, and thus all the current generated by the machine, instead of a part thereof, passes through the field-coils and almost instantaneously excites them.

This invention has for its object the production of a method for charging storage batteries in direct proportion to the current given by the charging-dynamo, whether that current be great enough to charge one or all of the cells, and for giving to all the cells of the battery a substantially equal charge.

In carrying out my improved method one cell or a group of cells of the battery is thrown in when the current attains sufficient strength to charge, and as the current increases toward the maximum charging-current of the cells already in the circuit another cell or group of cells is thrown into the circuit, and so on, thus introducing resistances from time to time into the circuit proportional to the current given by the dynamo, to thereby keep the charging-current below the maximum charging-current of the battery. When the motive power of the dynamo is variable, as if driven by a wind-wheel, and the speed decreases until the current approaches the minimum charging-current of the cells already in the circuit, one or more cells or groups of cells will be thrown out of the circuit until the resistance is such that the charging-current approaches the maximum, when the throwing out of cells will be discontinued and the throwing in or out of cells will continue in direct proportion as the current increases or decreases.

In practicing my method, in order to keep the cells charged as equally as may be, after a cell has received part of its predetermined charge it is thrown out of circuit, the former second cell thus becoming the first in the charging series, and when it has received part of its predetermined charge it is thrown out of circuit and the next cell becomes the first of the charging series, and so on until at least half the cells of the entire series have received their predetermined charge. Thereafter the cells of the other half of the series are charged, as has been described, it being understood, however, that when any of the cells of either half of the series are thrown out it does not prevent any or all of the cells farther along in the series from being thrown in or out as the current varies. In this method of charging there will always be at least one-half of the whole number of cells of the series which may be thrown into the charging-circuit, thus providing for a heavy increase in the charging-current.

I have herein shown one convenient form of apparatus for carrying out my invention, said apparatus being particularly adapted and arranged for use with a windmill motive power, but it is to be understood that my invention is not restricted to the apparatus shown and described hereinafter.

Figure 2:
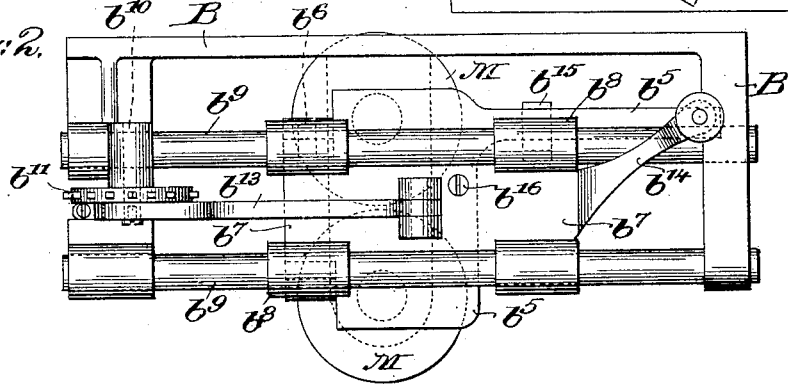

Figure 1 is a plan view of one form of apparatus by which my invention may be practiced, broken out in parts and with the circuits shown diagrammatically. Fig. 2, on an enlarged scale, represents the mechanism shown at the upper left-hand portion of Fig. 1 for controlling the switch-arms. Fig. 3 is a sectional view taken on the line $x\,x$, Fig. 1, of the controlling mechanism. Fig. 4 is a similar view on the line $x'\,x'$, Fig. 1, of the circuit-changing devices. Fig. 5 is a sectional detail on the line $x^2\,x^2$, Fig. 1. Fig. 6 is a diagrammatic view of the apparatus illustrated in Fig. 1 to more clearly show the relative arrangement of the parts and by which the operation can be readily followed. Fig. 7 is an enlarged view, partially broken out, of the devices shown at the upper part of Fig. 1 to more clearly show the construction of the parts mounted upon the shafts $b$ and $n^4$; and Fig. 8 is a top view of the mechanism shown in Fig. 7.

Referring to Figs. 1, 3, 7, and 8, a suitable bracket or support A has a bearing $a$ for one end of a shaft $b$, and an arm $a'$ has a bearing $a^2$ for the other end of said shaft, to which is secured by a set-screw $b'$ a ratchet-wheel $b^2$, the preferably-grooved hub $b^3$ thereof having attached to it a strap or band $b^4$, connected to a spring $s$, Fig 1, tending to turn the ratchet in the direction opposite to the arrow $b^\times$. The ratchet-wheel is moved at times step by step by means of a constantly-reciprocating pawl $b^5$, Fig. 1, pivoted at $b^6$ to a carriage $b^7$, Fig. 2, having hollow hubs $b^8$ to slide on guide-rods $b^9$, secured to or forming part of frame B. A shaft $b^{10}$, mounted in the frame, has thereon a sprocket-wheel $b^{11}$, connected to a suitable source of power to be rotated at a uniform and rather high speed, and by means of an eccentric $b^{12}$ and strap and rod $b^{13}$ the rotation of the shaft reciprocates the carriage and moves the pawl $b^5$ rapidly toward and from the ratchet-wheel. An upturned ear $b^{14}$ on the carriage supports an adjustable spring $s'$, connected to and to normally lift the outer end of the pawl, as shown in Fig. 1, so that it will not then move the ratchet forward, a stop $b^{15}$ limiting the drop of the pawl, which latter is laterally enlarged, as shown in Fig. 2, to form an armature for an electromagnet M, whose coils are included in the dynamo-circuit by wires $c\,c'$. The normal position of the armature-pawl is controlled by a suitable screw $b^{16}$.

When the magnet M is energized sufficiently to draw down the armature-pawl $b^5$, the latter is brought into position to move the ratchet-wheel $b^2$ forward one step at the next forward stroke of the carriage $b^7$, turning the shaft $b$ through a certain angle, and at the same time an auxiliary electromagnet M', included by wire $c^\times$ in the dynamo-circuit $c\,c'$, is energized to attract its armature $m$, overcoming the force of the retracting-spring $s^2$, Fig. 1, and a detent $m'$, forming a part of the armature, is moved into engagement with the ratchet-wheel $b^2$, preventing retrograde movement thereof.

The magnet M' is responsive to a weaker current than that necessary to energize the magnet M, and hence will retain the detent $m'$ in operative position after the armature $b^5$ is retarded, but the stroke of the latter is sufficiently great to move the ratchet $b^2$ forward slightly at each forward stroke to thus lift the ratchet from the detent and permit the latter to be withdrawn by spring $s^2$ when magnet M' is deënergized enough to permit it. The ratchet is then free to rotate retrogressively when the pawl $b^5$ makes its back stroke until the current again increases to the normal, throwing the detent $m'$ into engagement with the ratchet.

Two separated hubs $d$ and $d'$, Fig. 3, are secured to the shaft $b$ and provided with extensions, to which are secured bars $d^\times$ and $d'^\times$, of insulating material, and switch-arms D and D' are attached to the latter to be swung in one or the other direction by rotation of the shaft, said arms having at their lower ends preferably pivoted contacts $d^2\,d^3$, facing each other, as clearly shown in Fig. 3, adapted to sweep over a series of fixed contacts $e'\,e^2$ to $e^7$ and $f'\,f^6$ to $f'$, respectively, attached to a block $e^\times$, of insulating material, supported in suitable manner on a bracket $A^2$, Fig. 3.

In Fig. 6 I have shown the series of contacts as spread out diagrammatically, and a series of cells $q'\,q^2$ to $q^6$ of the storage-battery are connected by wires 1 2 3 to 7 to the corresponding contacts $e'\,e^2$, &c., the intermediate wires branching, so as to connect the + pole of one cell with the − pole of the next adjacent one. In said figure the terminals of the usual discharging-current are connected in well-known manner with the terminii of the battery, and inasmuch as the discharging-circuit is independent of the operation of the charging-circuit current may be withdrawn from the battery while it is in process of being charged.

The arms D and D' throw in or out one or more cells of the battery, as will be hereinafter described, and, referring to Fig. 6, it will be seen that the contacts of one series are electrically connected to the oppositely-located contacts of the other series $e'$ and $f'$, $e^6$ and $f^6$, and so on by the wires 10 20, &c., only one of the controlling-arms D or D' being electrically operative at any one time—i. e., only one of said arms D or D' is in the charging-circuit at a time. The insulating-block $e^\times$ is recessed on each face to receive elongated contact-plates $e^{10} e^{12}$. (Shown in section, Fig. 3, and in diagram, Fig. 6.) An arm $h^\times$, of insulating material, is loosely mounted on the shaft $b$ between the controlling-arms D and D', and has attached to its lower end two metal plates $h$ and $h'$, the former being adapted to sweep over the face of the plate $e^{10}$ and the backs of the contacts $e'$ $e^2$, &c., while the latter is movable between and in engagement with the contact-plate $e^{12}$ and the backs of the contacts $f^7$ $f^6$, &c., the contact-plates $e^{10}$ $e^{12}$ in Fig. 6 being shown out of actual position for the sake of clearness.

A curved contact-plate $d^4$, Figs. 1, 3, 7, and 8, is secured to and insulated from the hub $d$ and connected by a wire $d^5$ to the arm D, a similar plate $d^6$, insulated from the hub $d'$, being connected to arm D' by wire $d^7$, a brush $d^8$, continuously bearing on the plate $d^4$, being connected by a wire $c^2$ to one contact $i$ of the switch, to be described, a second brush $d^9$ bearing on the plate $d^6$ and being connected by wire $c^3$ to another contact $i^3$ of said switch.

The switch is shown in Figs. 1 and 4, and consists of a base $B^3$, supporting a block $k$, of insulating material, to which is secured the pair of clip or spring contacts $i$ and $i'$, insulated from each other, one clip being arranged above the other, and a second similarly-arranged pair of spring-contacts $i^2$ $i^3$, insulated from each other at $k'$, Fig. 4, are also secured to the block $k$ and facing the other pair, as shown in Fig. 1. The movable member of the switch consists of two metallic bars $k^2$ $k^3$, secured, as herein shown, to the upper and lower sides of an insulating-arm $k^4$, the metallic bar $k^3$ having thereon a socketed boss $k^5$, entered by a conical-ended fulcrum $k^6$, Fig. 4, secured to the insulator $k$, a similar boss $k^7$ on the bar $k^2$ being entered by a conical-pointed screw $k^8$, adjustable in a bracket $k^9$, also secured to the insulator $k$. The bar $k^2$ is in electrical connection with the wire $c'$, which is attached by a suitable binding-screw 100 to the bracket $k^9$, and said bar is adapted to close the circuit through either of the contacts $i$ or $i^2$, while the bar $k^3$ coöperates with either contact $i'$ or $i^3$, and, as shown in the drawings, the switch is thrown to close the circuit at contacts $i$ and $i'$.

In the diagram, Fig. 6, the switch-bars $k^2$ and $k^3$ are shown side by side to clearly illustrate the working thereof, and the contact plates and brushes intermediate the arms D D' and the contacts $i$ and $i^3$, respectively, are omitted for the same reason, the connecting-wires leading directly from the arms to the contacts.

A disk $k^{10}$ is rotatably mounted on the block $k$ and connected near its periphery by a spring $s^3$ to a pin $k^{11}$, passing through the switch bar or arm $k^3$ into the insulating-arm $k^4$, in which it can rotate, so that one-quarter of a rotation of the disk $k^{10}$ in the direction of arrow $k^\times$, Fig. 1, from the position shown will stretch the spring to throw the switch when released from the contacts $i$ $i'$ to the contacts $i^2$ $i^3$. The periphery of the disk is shaped to engage a sprocket-chain $k^{12}$, passing around a sprocket-wheel $n$, mounted on the hub $n'$ of a double let-off wheel $n^2 n^3$, Figs. 1, 5, 7, and 8, rotatable on a suitably-supported shaft or post $n^4$, the teeth of the let-offs $n^2 n^3$ being arranged alternately—that is, a tooth on one wheel is located midway between two adjacent teeth on the other wheel.

A preferably grooved barrel $n^5$ is loosely mounted on the post $n^4$ adjacent the let-offs, and cords $n^6 n^7$ are wound about it in opposite directions and secured thereto, the free end of cord $n^7$ having a weight $W^7$ thereon tending to rotate the barrel in the direction of arrow $n^\times$, Fig. 1, the cord $n^6$ serving as a winding-cord.

Ratchet-teeth $n^8$ on the barrel are engaged by a suitable pawl $n^9$ on the side of one of the let-offs, as clearly shown in Fig. 8, to rotate the latter with the barrel when they are free to move, the pawl slipping over the teeth when the weight-cord is being wound upon the barrel.

The hub $n^4$ is laterally extended to form a crank-arm, pivoted at $n^{10}$ to a link $n^{11}$, the other end of which is pivoted at $n^{12}$ to the insulation $h^\times$ of the follower-arm, whereby rotation of the sprocket-wheel $n$ will swing the said arm from the position shown in Fig. 1 to the right as far as the endmost contact and then back again.

Detents $o$ and $o'$ for the let-offs $n^2$ $n^3$, respectively, are fulcrumed at $o^\times$ and normally held with their shoulders $o^2$ and $o^3$ in the paths of the teeth of the respective let-offs by springs $s^4$ and $s^5$, the free ends of the detents being acted upon by oppositely-located cams $o^4$ and $o^5$, loose on the shaft $b$ and having attached to them or forming a part thereof a ratchet-wheel $o^6$, which is engaged by a pawl $o^7$ on the hub $d'$, and a detent $o^8$ preventing retrograde movement of the ratchet-wheel. (See dotted lines, Figs. 1 and 7.) As the cams $o^4$ and $o^5$ are oppositely located, it follows that one detent, as $o'$, Fig. 7, will be depressed by its cam while the other detent $o$ is raised by its spring to bring its shoulder $o^2$ in the path of the teeth on the coöperating let-off $n^3$ to engage the next tooth, and vice versa, so that only one detent at a time is moved to release a let-off, and each time a detent is depressed to release its let-off the parts on the post $n^4$ will be permitted to rotate a distance equal to one-half the distance between any two teeth on either let-off, so that a step-by-step rotation is given to the sprocket-wheel $n$ and the disk $k^{10}$, the ratio of said wheel and disk being as one to two.

The insulating-bar $k^4$ projects at its rear end and has secured thereto an ear $k^{20}$, notched at $k^{21}$ and $k^{22}$ to at times receive the end of a switch-lock (shown as a dog $k^{23}$) pivoted at $k^{24}$ and having a lug $k^{25}$ in the path of movement of a projection $d^{50}$ on the controlling-arm D, so that when the spring $s^3$ is under tension at either side of the movable switch member described withdrawal of the dog $k^{23}$ from the notched ear $k^{20}$ will permit the said switch member to jump from one to the other pair of contacts $i'$ $i'$ and $i^2$ $i^3$, a spring $s^6$, Fig. 1, returning the dog to operative position.

A cross-bar $d^{60}$, connecting the insulation-supports of the arms D and D', extends across the path of the controlling-arm $h^\times$, for a purpose to be described.

A binding-post $D^\times$ is connected to the positive pole of the dynamo, (not shown,) and the wire $c$ is connected to the same post, while a wire $c^6$ connects the metal stand $k^6$ with a post $D'^\times$, connected to the negative pole of the dynamo.

A wire $c^4$ connects the contact $i^2$ with the continuous contact-plate $e^{12}$, the latter having an ear $e^{30}$ shown thereon for the purpose of illustration, and the similar contact-plate $e^{10}$ is connected by wire $c^5$ to the contact $i'$, thus completing the circuits.

With the parts in the position shown in diagram, Fig. 6, the dynamo-current passes from wire $c'$ to switch-arm $k^2$, contact $i$, and wire $c^2$ to arm D, (shown as on the contact $e'$,) and as the follower-contact $h$ is on the other side of said contact the current will short-circuit through follower $h$, plate $e^{10}$, wire $c^5$ to contact $i'$, and back by switch-arm $k^3$ and wire $c^6$ to dynamo. When the current increases to the charging-point, the magnet M will be energized, attracting its armature-pawl $b^5$ to engage the ratchet $b^2$ and move it forward more or less, and it will be supposed that it will be moved far enough to swing the arms D and D' until they rest on the contacts $e^2$ and $f^6$, respectively. The switch remaining in the same position, the current will then traverse arm D, contact $e^2$, wire 2 to the cell $g'$ of the battery, back by wire 1 to contact $e'$, follower-contact $h$, plate $e^{10}$, and to dynamo, as before, charging the cell, and as the cell acts as a resistance the current will decrease the instant the cell is thrown in, partly deenergizing the magnet M; but the auxiliary magnet M' will still retain the detent $m'$ in engagement with the ratchet $b^2$, preventing return of arms D and D'. As the current flowing through the cell approaches the maximum charging-current, the increasing current will further energize the magnet M, and, as before, the ratchet-wheel $b^2$ will be moved forward, and it will be supposed that the arms D and D' will move to contacts $e^3$ and $f^5$, respectively. The current then passes from arm D to contact $e^3$, wire 3 to cell $g^2$, and through cell $g'$ to wire 1, contact $e'$, and so back to the dynamo, throwing in thereby the second cell, a cell being thrown into the charging-circuit whenever the current flowing through the cell or cells already in circuit approaches the maximum charging-current, it being supposed that the current from the dynamo is not diminished. If the current increased more rapidly, the arm D might throw in more than one cell, passing over one or more contacts before the resistance of the cells thrown in would be sufficient to deenergize the magnet M. When the current increases very rapidly, the throwing in of one or more cells would not increase the resistance of the circuit sufficiently to cause the current to fall below the maximum charging-current of the cells, and therefore the magnet M would not release the pawl $b^5$ until more cells or groups of cells had been thrown into the circuit.

Should the current decrease sufficiently to deenergize the auxiliary magnet M', releasing the ratchet-wheel $b^2$, it would move backward, and the arm D, moving correspondingly, would throw out one or more cells until the current was increased enough to energize the magnet M' again. It will be remembered, however, that the controlling-cams $o^4$ and $o^5$ are rotated with the ratchet-wheel $b^2$, and when the latter has rotated sufficiently one of the cams will move its detent to release one of the let-offs $n^2$ or $n^3$ one step at a time, and the partial rotation will be imparted to the link $n^{11}$, and thereby to the follower-arm $h^\times$, so that the follower-contacts $h$ and $h'$ will be moved correspondingly over the backs of the contacts $e'$ $e^2$, &c., and $f^7$ $f^6$, &c., the contacts $h$ and $h'$ never moving ahead of the controlling-arms D and D', the cross-bar $d^{60}$ preventing.

When the first cell has received approximately its predetermined charge, it should be thrown out of the charging-circuit, and the follower-contact $h$ accomplishes this, having been moved to contact $e^2$ and arm D being on contact $e^3$, for instance. The current then passes from the latter contact by wire 3 to cell $g^2$ and by wire 2 and contact $e^2$ to follower-contact $h$ and back to dynamo, cutting out cell $g'$.

When contact $e^4$ engages arm D and contact $e^3$ engages follower-contact $h$, only the cell $g^3$ will be charged, the two cells $g'$ $g^2$ being thrown out of the charging-circuit, as described, and when the contact-follower moves up to $e^4$ the first three cells will be thrown out and the current short-circuited, provided the arm D does not also move ahead. Now the follower-arm begins its return movement and a cell will be thrown into circuit for each contact of the series, separating the controlling-arm D and follower-contact, and the magnets M M' will be deënergized, allowing the arm D to move back from one contact to another of the series as permitted by the follower, throwing out one cell after another as it does so, but this time in the order $g^3$ $g^2$ $g'$. The follower-arm can only move back when the link $n^{11}$ pulls it back, and then only over one plate at a time. Before it can move another plate the ratchet-wheels $n^2$ or $n^3$ must be again released by one or the other of the detents $o$ $o'$, and obviously some considerable time will elapse before the follower-arm makes a second movement. The arm D can move over any contact-plate farther along in the series than the one adjacent the follower-arm $h^\times$, but it can never return past said follower-arm, because the stop $d^{60}$, connecting the arms D D', will bear against the follower-arm. If the arm D did not return to the starting-point and throw the movable switch member, thereby allowing the arm D' to operate in charging the remaining half of the cells, the latter would never be fully charged, and one of the important features of this invention is the charging from one end of the series and then from the other, so that the charge in the cells becomes more equalized—that is, the cells that receive the most current in the first part of the process receive the least when the charging begins from the other end of the series, and vice versa.

When the arm D reaches contact $e'$, the projection $k^{25}$ of the switch-dog $k^{23}$ will be struck by the lug $d^{50}$ and the switch released, the disk $k^{10}$ having made one-quarter of a turn from the position shown in Fig. 1, and the movable switch member will be thrown to close the circuit at the contacts $l^2$ $l^3$. The dynamo-current then passes from wire $c'$ to arm $k^2$, contact $i^2$ and wire $c^4$ to contact-plate $e^{12}$, and thence by follower-contact $h'$ to contact $f^7$ of the series, to arm D', wire $c^3$, contact $i^3$, and arm $k^3$ back to dynamo. An increase of current is now transmitted by the follower-contact $h'$ and arm D', the movements being as before described, but when D' is on contact $f^6$ the current passes by wire 70 to contact $e^7$, wire 7 to cell $g^6$, the endmost one of the yet uncharged cells, through wire 6 to contact $e^6$, and by wire 60 to contact $f^6$, and so by arm D' back to dynamo. An increase of current will move D' to contact $f^5$, and then cell $g^5$ will be thrown in, the return current passing back over wire 5, contact $e^5$, and wire 50, and so on; but the positive movement of the follower-contacts is also taking place, to throw out one cell after another as it receives its predetermined charge, until by the time the central position of the follower-contacts is attained the cells $g^6$, $g^5$, and $g^4$ will have received their predetermined charges and the reverse movement begins,
and, beginning with cell $g^4$, the cells are thrown in and out one after another until the arms D and D' are again at the extreme right, Fig. 1. The disk $k^{10}$ has then been turned until the spring $s^3$ is under tension above the movable switch member, and the dog $k^{23}$ being tripped, as heretofore described, it will be moved out of the notch $k^{22}$ and the switch will be thrown into the position shown in Figs. 1 and 6.

The operation of the apparatus from beginning to end, step by step, and in the regular order of time is as follows: At starting the arms D D' and follower-arm $h^\times$ are in contact with the plate $e'$, Fig. 1, and the switch-arm $k^2$ is in such position as to include the arm D and the plate $e^{10}$ in the circuit. The dynamo is at such time short-circuited through the magnets M M', switch-arm $k^2$, arm D, plate $e'$, and plate $e^{10}$ to the dynamo. When the current begins to flow, it excites the dynamo sufficiently to operate the pawl $b^5$ and cause the arm D to assume a position directly over and in contact with the plate $e^2$. The circuit is now precisely the same as before, except that the cells connected between the plates $e'$ and $e^2$ are now included in the circuit and are being charged. If the dynamo gives a continued large current in spite of this additional resistance, the operation is repeated and another set of cells thrown into the circuit until the resistance of the circuit bears such a relation to the voltage of the charging-current as to cause the proper quantity or amperes of current to flow through the cells. When this point, which I will call the "balancing-point," is reached, the pawl $b^5$ is no longer held in position to move the arm D the next time the said pawl approaches the ratchet-wheel $b^2$, because the magnet M has released the pawl. Now if the dynamo slows down the current becomes less, on account of the drop of potential, and the magnet M' can no longer hold the armature $m$ against the spring $s^2$, and the detent $m'$ will be withdrawn from the ratchet-wheel $b^2$, so that the arm D will return toward the plate $e'$, switching out cells every time it leaves a plate in moving toward the right, Fig. 1. This continues until the balance between the voltage of the charging-current and the resistance of the cells is again reached, when the armature $m$ is again attracted to magnet M', throwing the detent $m'$ into engagement with the ratchet $b^2$ and checking the movement of the arm D. This cutting of the cells into and out of the charging-circuit is effected at each change of speed of the dynamo. It is to be remembered that such forward movement of the arm D—that is, to the left, Fig. 1—moves the ratchet-wheel $o^6$ proportionally, and in course of time the latter will have moved the cams $o^4$ and $o^5$, attached thereto, so as to release one of the detents $o^2$ or $o^3$, as the case may be, to thus permit the crank $n'$, Figs. 1 and 7, to move the follower-arm $h^\times$ from the plate $e'$ to plate $e^2$. This operation throws out of circuit the cells connected between the plates $e'$ and $e^2$, and they cannot be included in the charging-circuit again until the other groups of cells have received a like treatment. The plate $e^2$ is to be the − end of the series or the starting-point, and the cycle of operations now takes place with said plate $e^2$ as the base or starting-point, and in course of time the follower-arm will be again moved, in the same manner as before, onto the plate $e^3$, which then becomes the starting-point of the series. This step-by-step movement is continued until the follower-arm reaches the middle plate of the series, the crank which moves the follower-arm $h^×$ at such time being at its maximum throw, so that the next movement of said crank will cause the follower-arm to return from plate $e^4$ to $e^3$, to $e^2$, and to $e'$, thus throwing them out, the follower-arm operating in the same way and after the same cycle of operations have been performed as were performed to move it to the middle of the series. After the follower-arm $h^×$ has completed such retrograde movement and assumes a position behind plate $e'$ and the current diminishes to such an extent as to permit the arms D D' to be drawn back over the plate $e'$, thus throwing out all the cells, another series of operations will begin precisely after the manner just described, with the exception, however, that the arm D has thrown the switch-arm $k^2$, Fig. 1, so that the charging-circuit is now broken through the arm D and established through the arm D' and plate $e^{12}$, so that the back set of plates are now active instead of the front set. As the back series of plates are cross-connected with the front series, it will be seen that while the charging-arms D D' and the follower-arm $h^×$ travel over the same space in the same order as before they are really charging the cells connected to the plates $e^6$ $e^5$ $e^4$ instead of those connected to the plates $e^2$, $e^3$, and $e^4$. Thus after the follower-arm has traveled its full throw and back again in conjunction with the charged arm D' all of the cells will have been partly charged and the apparatus will be in position to exclude the arm D' from the charging-circuit and include the arm D by again throwing the switch-arm $k^2$ to its former position. The whole cycle of operations of the switch apparatus has now been performed, and it is ready to repeat the cycle.

It is intended to complete the cycle of movement of the switch apparatus in small plants in about one hour if the wind is of fair strength, so that the whole operation of the apparatus would have to be repeated a number of times before the charging of the cells would be completed. This insures the cells receiving substantially equal treatment.

For convenience it has been supposed that one cell at a time has been thrown into the charging-circuit and also thrown out one at a time, but it will be understood that as the arms D and D' are controlled as to the extent of their movements solely by the current they may move so as to throw in or out one or more cells, depending entirely upon the extent of variation of the current.

If the current had been sufficient to charge several cells and the current had suddenly decreased below the minimum charging-current, so that even one cell could not be charged, caused by a fall in the motive power of the dynamo, the magnets M and M' would be deenergized to permit the ratchet-wheel $b^2$ to rotate retrogressively to move the arms D and D' toward the follower-contacts, throwing out all of the cells by short-circuiting with said follower-contacts, and until the current increased to the charging-current no cell would be brought into the charging-circuit.

The controlling-arms D and D' can never move backward farther than the follower-arm, owing to the cross-bar $d^{50}$.

As a wind-wheel may be speeded up very suddenly to a high speed, to thereby increase the dynamo-current correspondingly, it might happen that the whole number of battery-cells might not be sufficient to accommodate such current, and for this reason one or more resistances R R' (see Figs. 1 and 6) can be connected up with the series of contacts $e'$ $e^2$, &c., $f^7 f^6$, &c., each resistance being about the same as that of a battery-cell.

By the apparatus herein shown and described my improved method of charging is automatically carried out, and power of a wind-wheel or other variable source may thus be utilized for generating electrical energy to be stored up for use as needed.

My invention is not restricted to the apparatus herein shown, for other mechanism may be employed for carrying out my invention, the gist of which consists in utilizing the current whenever it is sufficient to charge one or more cells without in any manner disturbing the discharging-circuit, whereby the accumulator may be discharged as a whole while any one or more of the cells are being charged.

I claim—

1. The herein-described method of charging accumulators which consists in having the number of cells in the charging-circuit in direct proportion to the strength of said current, the discharging-circuit of the cells remaining undisturbed throughout the operation, substantially as described.

2. The herein-described method of charging accumulators which consists in charging one or more cells at a time the number of cells being charged being in direct proportion to the charging-current, and throwing out of the charging-circuit one or more cells at a time as the minimum charging-current is approached, substantially as described.

3. The herein-described method of charging accumulators, which consists in having the number of cells in the charging-circuit in direct proportion to the strength of said current, substantially as described.

4. The herein-described method of charging accumulators, which consists in temporarily throwing out of the charging-circuit one or more cells as they receive a predetermined charge, and varying from time to time the relative position of the initial cell of the series being charged, substantially as described.

5. The herein-described method of charging accumulators, which consists in including in the charging-circuit one or more cells as the maximum charging-current of the cell or cells already in said circuit is approached; throwing out of said circuit one or more cells as the minimum charging-current is approached; and controlling the inclusion and exclusion of the cells by the variations in the charging-current, substantially as described.

6. The herein-described method of charging accumulators, which consists in throwing one or more cells of the series into the charging-circuit, throwing out of said circuit the cells successively from one end of the series to the center as the cells receive a predetermined charge, and thereafter repeating the operation with the cells of the other half of the series, substantially as described.

7. The herein-described method of charging accumulators, which consists in throwing in or out of the charging-circuit one or more cells in direct proportion to the charging-current, throwing out of the circuit the cells successively from one end of the series to the center as such cells receive a predetermined charge, thereafter throwing the cells into or out of the charging-circuit beginning at the opposite end of the series, and finally throwing out the cells of the latter half successively from the adjacent end of the series as they receive a predetermined charge, substantially as described.

8. In an apparatus for charging accumulators, a series of contacts connected to the cells, a controlling-contact movable over said contacts, to determine the number of cells to be included in the charging-circuit, means controlled by variation of the charging-current to automatically move said contact, and a coöperating follower-contact to automatically cut out of the charging-circuit the cells successively, substantially as described.

9. In an apparatus for charging accumulators, a series of contacts connected to the cells, a controlling-contact and a follower-contact movable over said series of contacts, means governed by variation of the charging-current to move the controlling-contact and thereby determine the number of cells to be included in the charging-circuit, and independent devices to move the follower-contact step by step from one end of the series of contacts to the center and back again, substantially as described.

10. In an apparatus for charging accumulators, two simultaneously-movable controlling-contacts, only one of which is in the charging-circuit at a time, two separate series of contacts upon which they bear respectively, said series of contacts being cross-connected with the cells of the accumulator whereby when the charged controlling-contact bears upon any particular contact of one series the uncharged controlling-contact is in connection with the oppositely-located contact of the other series, means to move said controlling-contacts, and a switch to include one or other of said controlling-contacts in the charging-circuit, substantially as described.

In testimony whereof I have signed my name to this specification in the presence of two subscribing witnesses.

CLARENCE C. BRAMWELL.

Witnesses:
JOHN C. EDWARDS,
FREDERICK L. EMERY.